(12) United States Patent
Zalivaka et al.

(10) Patent No.: US 11,650,795 B2
(45) Date of Patent: May 16, 2023

(54) RAW READ BASED PHYSICALLY UNCLONABLE FUNCTION FOR FLASH MEMORY

(71) Applicant: SK hynix Inc., Gyeonggi-do (KR)

(72) Inventors: Siarhei Zalivaka, Minsk (BY); Alexander Ivaniuk, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 704 days.

(21) Appl. No.: 16/549,621

(22) Filed: Aug. 23, 2019

(65) Prior Publication Data

US 2021/0055912 A1 Feb. 25, 2021

(51) Int. Cl.
*G06F 7/58* (2006.01)
*G06F 3/06* (2006.01)

(52) U.S. Cl.
CPC ............ *G06F 7/588* (2013.01); *G06F 3/0604* (2013.01); *G06F 3/0653* (2013.01); *G06F 3/0659* (2013.01); *G06F 3/0679* (2013.01)

(58) Field of Classification Search
CPC ...... G06F 7/588; G06F 3/0604; G06F 3/0653; G06F 3/0659; G06F 3/0679; G06F 21/79
See application file for complete search history.

(56) References Cited

U.S. PATENT DOCUMENTS

| | | | |
|---|---|---|---|
| 8,996,596 B2 | 3/2015 | Shim et al. | |
| 2010/0057820 A1* | 3/2010 | Matsumoto | G06F 7/588 708/250 |
| 2010/0250637 A1* | 9/2010 | Shim | G06F 7/588 708/250 |
| 2012/0030268 A1* | 2/2012 | Liu | H04L 9/001 708/254 |
| 2015/0169247 A1* | 6/2015 | Wang | G06F 3/0652 711/103 |
| 2019/0304410 A1* | 10/2019 | Ogaki | G09G 5/391 |
| 2020/0110891 A1* | 4/2020 | Pope | G06F 21/62 |
| 2020/0204367 A1* | 6/2020 | Miller | G06F 21/72 |
| 2020/0301768 A1* | 9/2020 | Papandreou | G06F 11/076 |
| 2020/0319805 A1* | 10/2020 | Chang | G06F 3/0659 |
| 2021/0011656 A1* | 1/2021 | Sheperek | G11C 11/5642 |
| 2022/0075070 A1* | 3/2022 | Kawahito | G01S 17/10 |

OTHER PUBLICATIONS

Zalivaka et al., Design and Implementation of High-Quality Physical Unclonable Functions for Hardware-Oriented Cryptography, Secure System Design and Trustable Computing, Oct. 2015, pp. 39-81, DOI: 10.1007/978-3-319-14971-4_2, Springer International Publishing AG, Switzerland.
Mjayakumar et al., On Testing Physically Unclonable Functions for Uniqueness, IEEE 17th Int'l Symposium on Quality Electronic Design(ISQED'16), Mar. 2016, pp. 244-249, DOI: 10.1109/ISQED.2016.7479229, Santa Clara, USA.

* cited by examiner

*Primary Examiner* — Charles Rones
*Assistant Examiner* — Tong B. Vo
(74) *Attorney, Agent, or Firm* — IP & T Group LLP

(57) ABSTRACT

A multi-level memory cell NAND structure of a memory device is utilized to extract uniqueness from the memory device. Certain unreliable characteristics of a NAND-based storage are used to generate a true random number sequence. A method for generating such sequence is based on a physically unclonable function (PUF) which is implemented by extracting unique characteristics of a NAND-based memory device using existing firmware procedures.

19 Claims, 11 Drawing Sheets

FIG. 8

Table 1. Example of tuning $\alpha, \beta$

| Sequence | $U$ | $BFR$ | $\psi, \alpha=\beta=1$ | $\psi, \alpha=1, \beta=0.1$ | $\psi, \alpha=0.1, \beta=1$ |
|---|---|---|---|---|---|
| 1 1 0 1 0 1 | 0.66 | 0.8 | 1.44 | 0.74 | 0.866 |
| 0 0 0 1 1 1 | 0.8 | 0.2 | 1.0 | 0.82 | 0.28 |

RAW READ BASED PHYSICALLY UNCLONABLE FUNCTION FOR FLASH MEMORY

BACKGROUND

1. Field

Embodiments of the present disclosure relate to a technique for random sequence generation based on noise characteristic values of bits within pages of a memory block.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NAND-type flash memory operates primarily in memory cards, USB flash drives, solid-state drives (SSDs), and similar products, for general storage and transfer of data.

Modern NAND-type flash storage devices use different types of is physical blocks, which are distinguished by the types of memory cell therein. A physical block may comprise (i) single-level cells (SLCs), each capable of storing a single bit, multi-level cells (MLCs), each capable of storing two bits, (iii) triple-level cells (TLCs), each capable of storing three bits, or (iv) quad-level cells (QLCs), each capable of storing four bits. The memory cells in a given block are grouped to define pages. To increase overall storage capacity, the trend has been to implement NAND-type flash storage devices with higher capacity memory cells, i.e., SLC→MLC→TLC→QLC. Doing so, however, has led to reliability issues.

Physically unclonable functions (PUFs) are widely used as hardware primitives for unique integrated circuit identification and true random number generation (TRNG).

In this context, embodiments of the present invention arise.

SUMMARY

Aspects of the present invention are directed to methods of operating memory systems, particularly flash-based NAND memory systems, to generate random number sequences based on characteristics of a memory device of the memory system. According to one aspect, a method for random number generation comprises performing multiple read operations for each of a plurality of pages in a selected memory block, among a plurality of memory blocks in the memory device, the plurality of pages including a plurality of bits; determining a noise characteristic value for each bit of the plurality of bits; identifying bits having respective noise characteristic values greater than a threshold; and generating a random number sequence using at least some of the identified bits.

Another aspect of the present invention is directed to memory systems configured to perform operations to generate random number sequences. According to one aspect, such memory system comprises a NAND-type flash memory including memory blocks, each including memory cells, each capable of storing multiple bits, the memory cells in each memory block being arranged to form pages; and a controller. The controller is operated to perform multiple read operations for each of at least some of the pages in a selected memory block, among the memory blocks, determine a noise characteristic value for each bit among the pages on which the multiple read operations are performed, identify bits having respective noise characteristic values greater than a threshold, and generate a random number sequence using at least some of the identified bits.

Additional aspects of the present invention will become apparent from the following description.

BRIEF DESCRIPTION OF THE DRAWINGS

FIG. 8 is a table showing Uniformity (U) and Bit Flipping Rate (BFR) for different sequences under different conditions, in accordance with an embodiment of the present invention.

DETAILED DESCRIPTION

Figure 1:
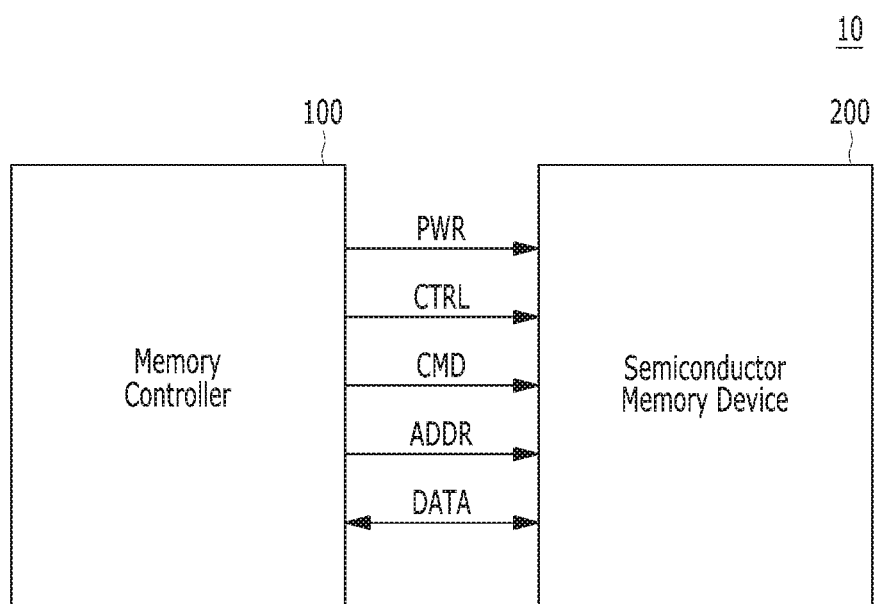
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring FIG. 1, the memory system 10 may include a memory controller 100 and a semiconductor memory device 200, which may represent more than one such device. In various embodiments, the semiconductor memory device(s) 200 are preferably flash memory device(s), particularly of the MLC, TLC and/or QLC NAND-type. For brevity, semiconductor memory device 200 is sometimes simply referred to as memory device 200, NAND-type flash memory 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
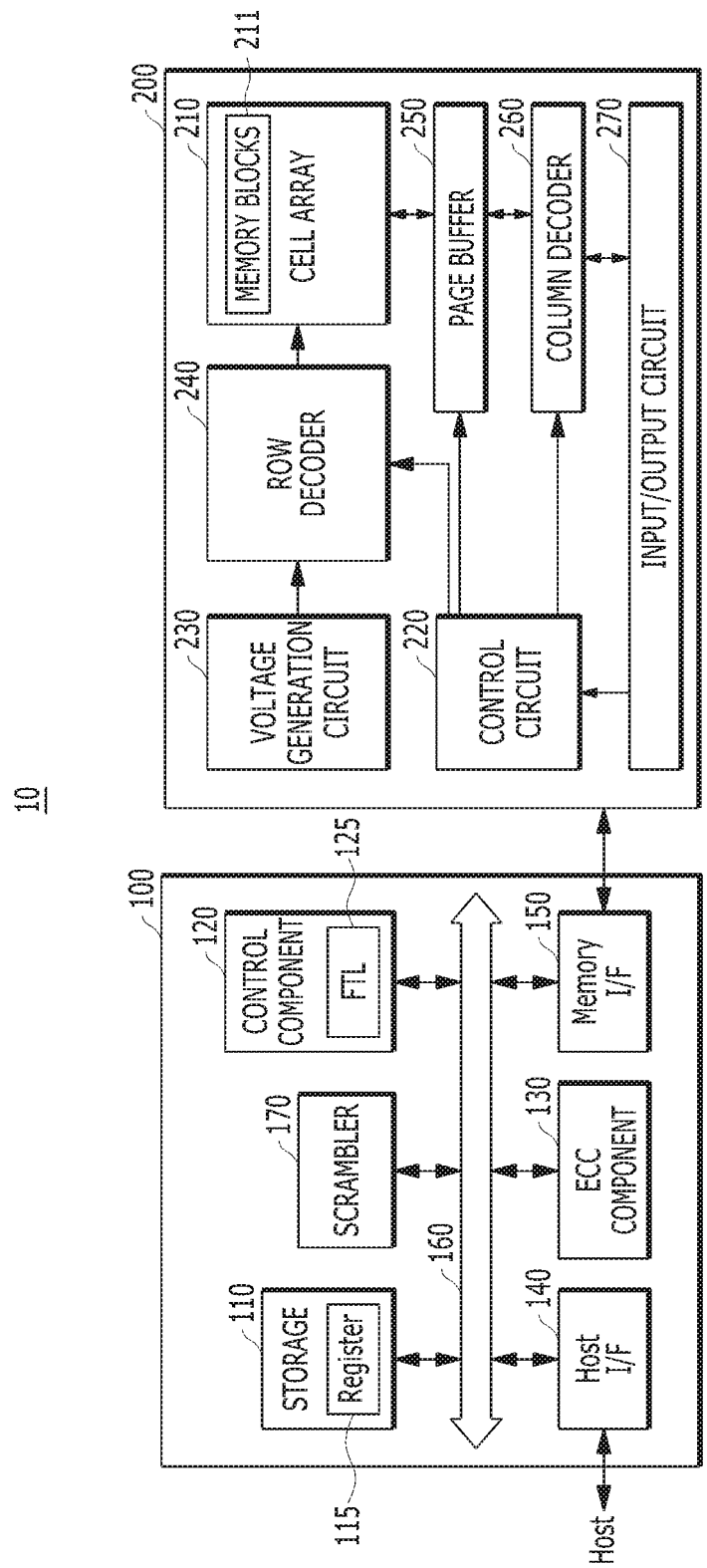
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a scrambler 170, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like. The storage 110 may also include a register 115, which may be used as described below.

The control component 120 may control general operations of the memory system 10, and a write operation or a read operation for the memory device 200, in response to a write request or a read request from the host device. The control component 120 may drive firmware, which is referred to as a flash translation layer (FTL) 125, to control general operations of the memory system 10. For example, the FTL 125 may perform operations such as logical-to-physical (L2P) mapping, wear leveling, garbage collection (GC), and/or bad block handling. The FTL 125 may be implemented, as a firmware, in the control component 120 or in the controller 100. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits..

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM), The ECC component 130 may include any and all circuits, systems or devices for suitable error correction operation.

The scrambler 170 may be used to uniformly distribute bits in data send from a host before storing such data in the memory device 200. This helps to increase reliability of the memory device 200 and decrease wear-out effects. The scrambler 170 may be implemented based on a linear feedback shift register (LFSR). Alternatively, the is scrambler 170 may be implemented in any other suitable way.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer (array) 250, which may be in the form of an array of page buffers, a column decoder 260, and an input/output circuit 270. The memory cell array 210 may include a plurality of memory blocks 211 which may store data. Subsets of the memory blocks may be grouped into respective super blocks (SBs) for certain operations.

The voltage generation circuit 230, the row decoder 240, the page buffer 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
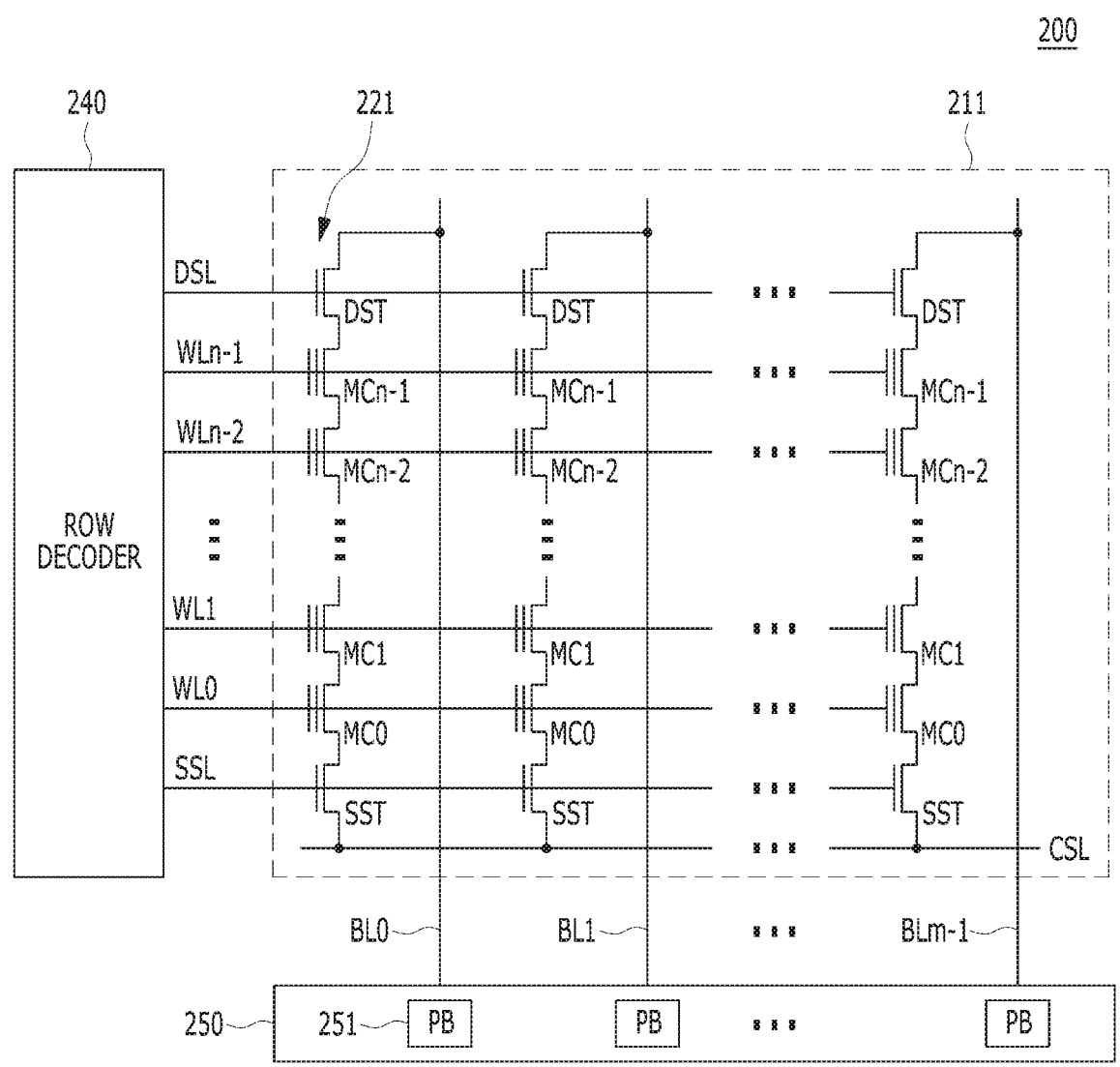
FIG. 3 is a circuit diagram illustrating a memory block of a memory device of a memory system in accordance with an embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a single-level cell (SLC), a multi-level cell (MLC), triple-level cell (TLC), quad-level cell (QLC) or higher-level cell storing data information.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

The memory blocks 211 may include a particular capacity NAND-type or NOR-type flash memory cells. Memory cell array 210 also may be implemented as a hybrid flash memory in which two or more types of memory cells are combined, or as a one-NAND flash memory in which a controller is embedded inside a memory chip. Memory blocks 211 comprising higher-capacity NAND-type flash memory cells, e.g., NAND MLCs, TLCs, QLCs, have particular applicability to the present invention.

As previously noted, increasing the capacity of the memory cells used to implement the NAND-type flash memory 200 has led to reliability issues. The inventors have discovered that this downside can be used for an opposite purpose, i.e., faults in blocks and pages can be utilized as a source of uniqueness for both chip identification and true random number generation (TRNG). Modern MLC, TLC and QLC NAND flash memory devices 200 tend to have massive ECC engines which negotiate the effect of intrinsic NAND instability. However, disabling ECC and scrambler modules 130, 170 during the read (raw read mode) and write operation allows extracting less stable bits and using them to generate uniformly distributed random bits. As a result, one block of NAND can be separately used to generate a random number sequence during the read operation. The TRNG technique, according to embodiments of the present invention, does not require additional circuitry for its implementation and random numbers can be extracted during the read operation in the raw mode. The raw mode indicates a read operation with the ECC and scrambler modules 130, 170 disabled.

In accordance with various embodiments of the present invention, a technique or algorithm of true random sequence generation based on a NAND-type flash memory device 200 implemented with memory cells of high capacity, e.g., TLC, memory cells, is provided. The generation process is based on noise extraction from unique characteristics of the memory cells of the MLC/TLC/QLC NAND 200. The inventive technique is based on PUF which is implemented using existing firmware functions. Thus, the present technique does not require a redesign of the existing memory system 10, e.g., System on a Chip (SoC), and can be used directly from the firmware level.

The TRNG algorithm, according to an embodiment, has two stages or phases. The first stage is enrollment, in which positions of noisy bits are located during a read operation. The second stage is operation, in which noisy bits are read from their respective positions determined during the enrollment stage.

Figure 4:
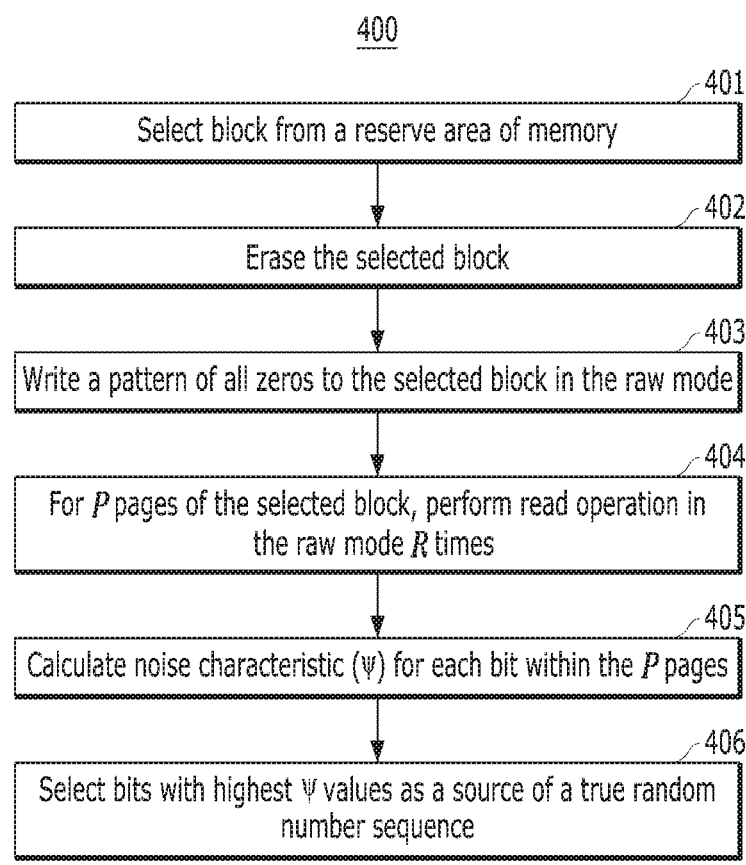
FIG. 4 is a flow chart illustrating an enrollment stage of a true random number generation (TRNG) process in accordance with an embodiment of the present invention.

FIG. 4 is a flow chart 400 illustrating the enrollment stage. The steps shown in FIG. 4 are exemplary. Those skilled in the art will understand that additional and/or alternative steps may be performed, or that the order of steps may be changed, to effectuate aspects of the present invention without departing from the inventive concepts disclosed herein.

In step 401, a memory block is selected from a reserve area in the NAND-type memory device 200. The reserve area represents memory blocks for over-provisioning.

In step 402, all content in the selected memory block is erased. After erasing the selected memory block, an all zeros pattern is written to that block in the raw mode, i.e., ECC and scrambler 130, 170 are disabled during this operation, in step 403.

Next, in step 404, for every page $p_i$ ($0 \leq i \leq P-1$) of the selected memory block, a read operation is performed in the raw mode R times, where P is the number of pages in the block.

In step 405, a noise characteristic ($\psi$) value or score is calculated for each bit $b_j$ ($0 \leq j \leq B-1$) within all P pages. If $\psi=0$, that indicates that the bit $b_j$ is stable. $\psi$ ranges from 0 to 1, where a $\psi$ score of 0 for a given bit means that bit is stable. The greater the $\psi$ score means that the associated bit is more random. Here, B is the number of bits in a page. The $\psi$ values, after being calculated, may be stored offline to an array A containing P*B elements. Array A may be maintained at any suitable location including external storage.

Figure 5:
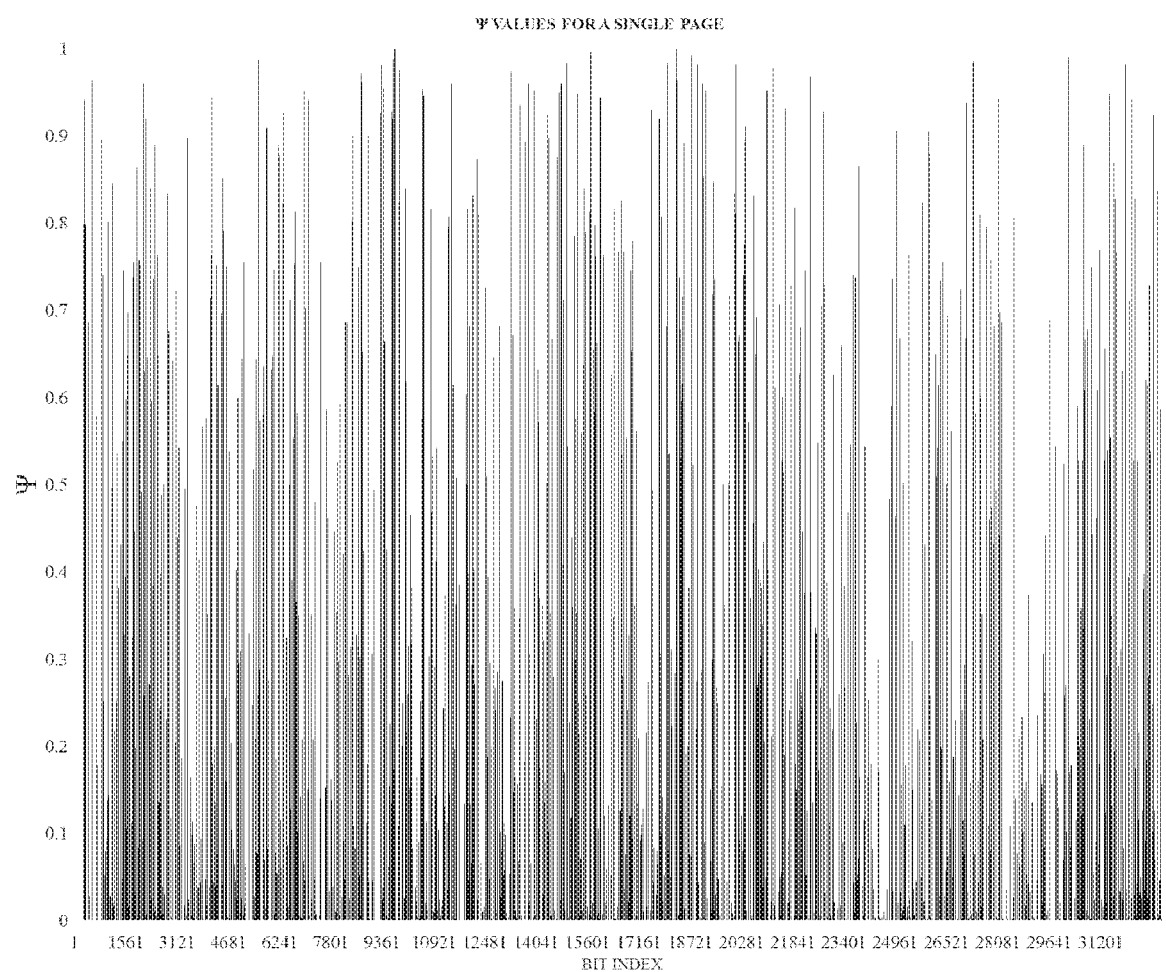
FIG. 5 is a bar chart showing an example of flipping bits within a single TLC page after 1000 reads.

FIG. 5 is a bar chart that shows the ψ values or scores for each bit $b_j$ within chosen page $p_i$. The chart is generated by reading bits R=1000 times within a single TLC page in raw mode.

Returning to FIG. 4, in step 406, the bits with the highest ψ values are selected as a source of a true random number sequence. The number of bits selected is based on the size L of the register, which is described in connection with FIG. 6. For example, if L=3, the 3 bits with the highest ψ values are selected.

Figure 6:
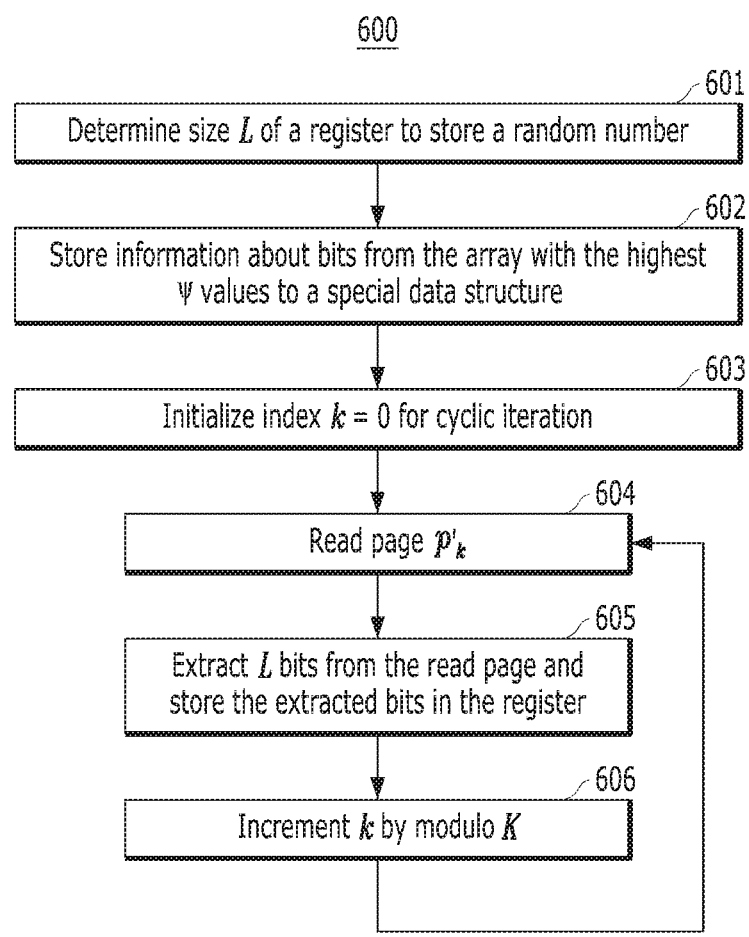
FIG. 6 is a flow chart illustrating an operation stage of a TRNG process in accordance with an embodiment of the present invention.

After the enrollment, the operation stage of TRNG algorithm or process is performed. FIG. 6 is flow chart 600 illustrating the operation stage. The steps shown in FIG. 6 are exemplary. Those skilled in the art will understand that additional and/or alternative steps may be performed, or that the order of steps may be changed, to effectuate aspects of the present invention without departing from the inventive concepts disclosed herein.

In step 601, a size L of a register $R_{TRNG}$ is determined to store a random number. RTRNG may be register 115 of FIG. 2.

Figure 7:
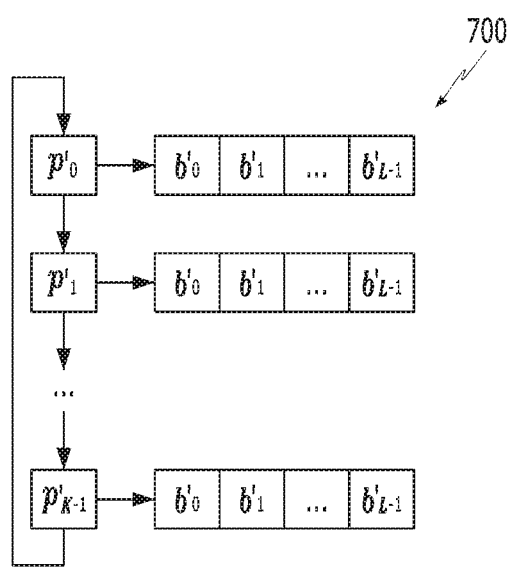
FIG. 7 is a diagram illustrating a data structure for storing noisy bits from different pages within a memory block, in accordance with an embodiment of the present invention.

In step 602, information about noisy bits from array A with the highest ψ scores is stored to a special data structure 700, such as that shown in FIG. 7. Bit $p'_k$:$b'_l$ (0≤k≤K−1, 0≤l≤L−1) corresponds to a ψ score A[i][j] of a bit from page $p_i$. Here, K is the number of pages chosen for random number generation. The data structure 700 may be maintained in the storage 110 or other suitable location.

In step 603, an index k=0 is initialized for cyclic iteration.

In step 604, a page $p'_k$ is read in raw mode.

In step 605, L bits $p'_k$:$b'_0$ ... $p'_k$:'$_{L-1}$ are extracted and then stored in the $R_{TRNG}$ register.

In step 606, k is incremented by modulo K, after which the process returns to step 604.

As an example, an SSD was tested to show randomness of the technique.

In the enrollment stage, block 0×84 was selected, erased and written with zeros in the raw mode, which constitute steps 401-403. A read operation was repeated in the raw mode R=1000 times for step 404.

The randomness of each bit can be estimated by calculating two metrics for each bit (step 405). Those metrics are Uniformity (U) and Bit Flipping Rate (BFR).

$$U = 1 - 2 \times \left| \frac{R_1}{R} - 0.5 \right|,$$

where $R_1$ is the number of bits with the value of '1'.

For example, if there were 5 read operations and the values obtained were 1 1 0 1 0, then U =1−2*|3/5−0.5 |−1−2*0.1−0.8.

$$BFR = \frac{\sum_{i=0}^{B-2} b_i \oplus b_{i+1}}{B-1}$$

For example, if B=5 and the values obtained were 1 1 0 1 0, then BFR=((1 xor 1)+(1 xor 0)+(0 xor 1)+(1 xor 0))/4==3/4=0.75.

Based on U and BFR noise characteristics, (ψ) can be calculated for each bit as follows: ψ=α+U+β×BFR, where α, β are tunable parameters which determine the importance of either uniformity or the bit flipping rate.

This example is summarized in Table 1 shown in FIG. 8. Thus, increasing the importance of uniqueness, sequence 0 0 0 1 1 1 can be considered more random than 1 1 0 1 0 1. However, usually, BFR is more important and correlated with uniqueness. Therefore, the third case is more realistic.

In step 406, an array (e.g., array A) was computed based on the information obtained in step 405.

Figure 9:
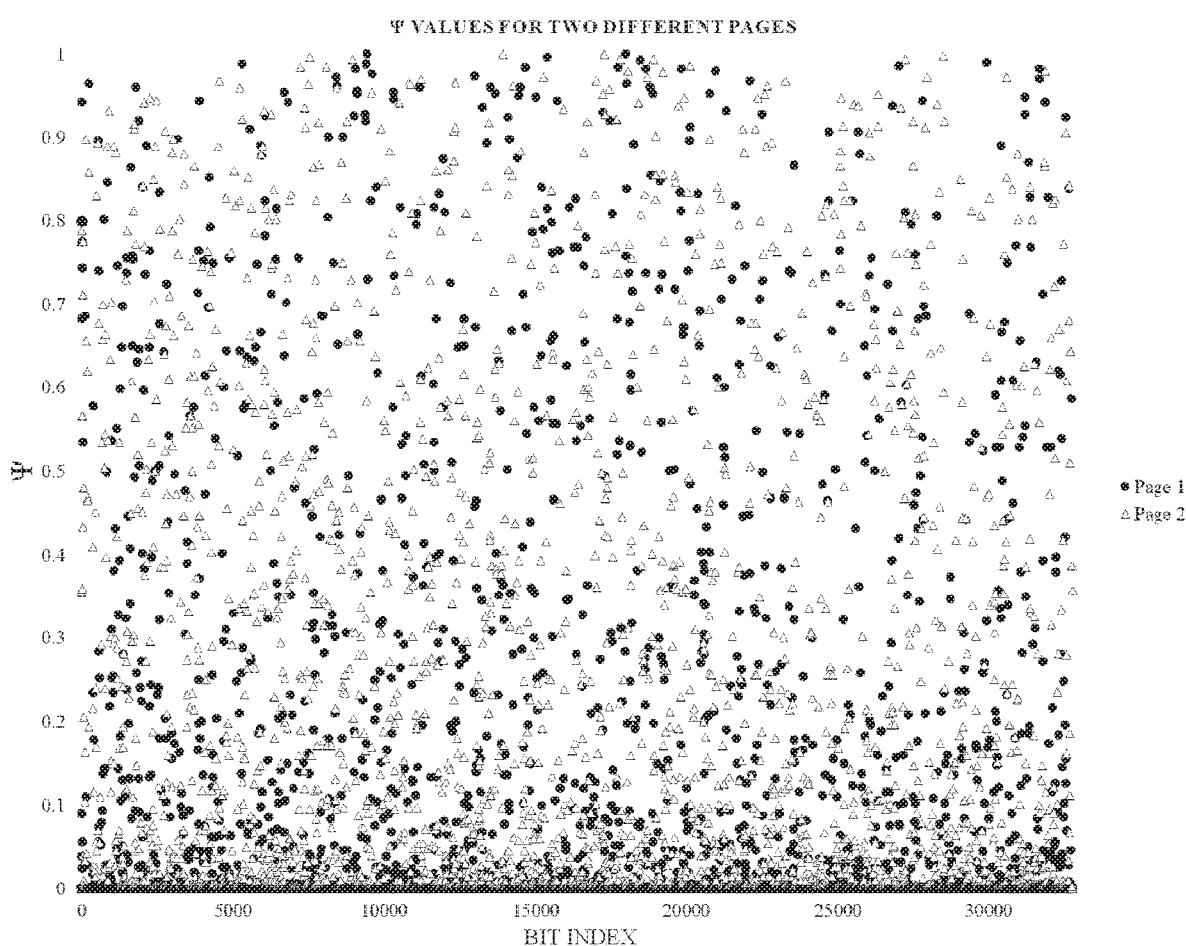
FIG. 9 shows noise characteristics ($\psi$) for pages with the same address and within the same memory block in different samples, in accordance with an embodiment of the present invention.

A page with index 0×42 was selected to show the uniqueness of the noisy bit locations. FIG. 9 shows the noise values (ψ) for the pages with index 0×42 within block 0×84 for identical SSD samples.

Figure 10:
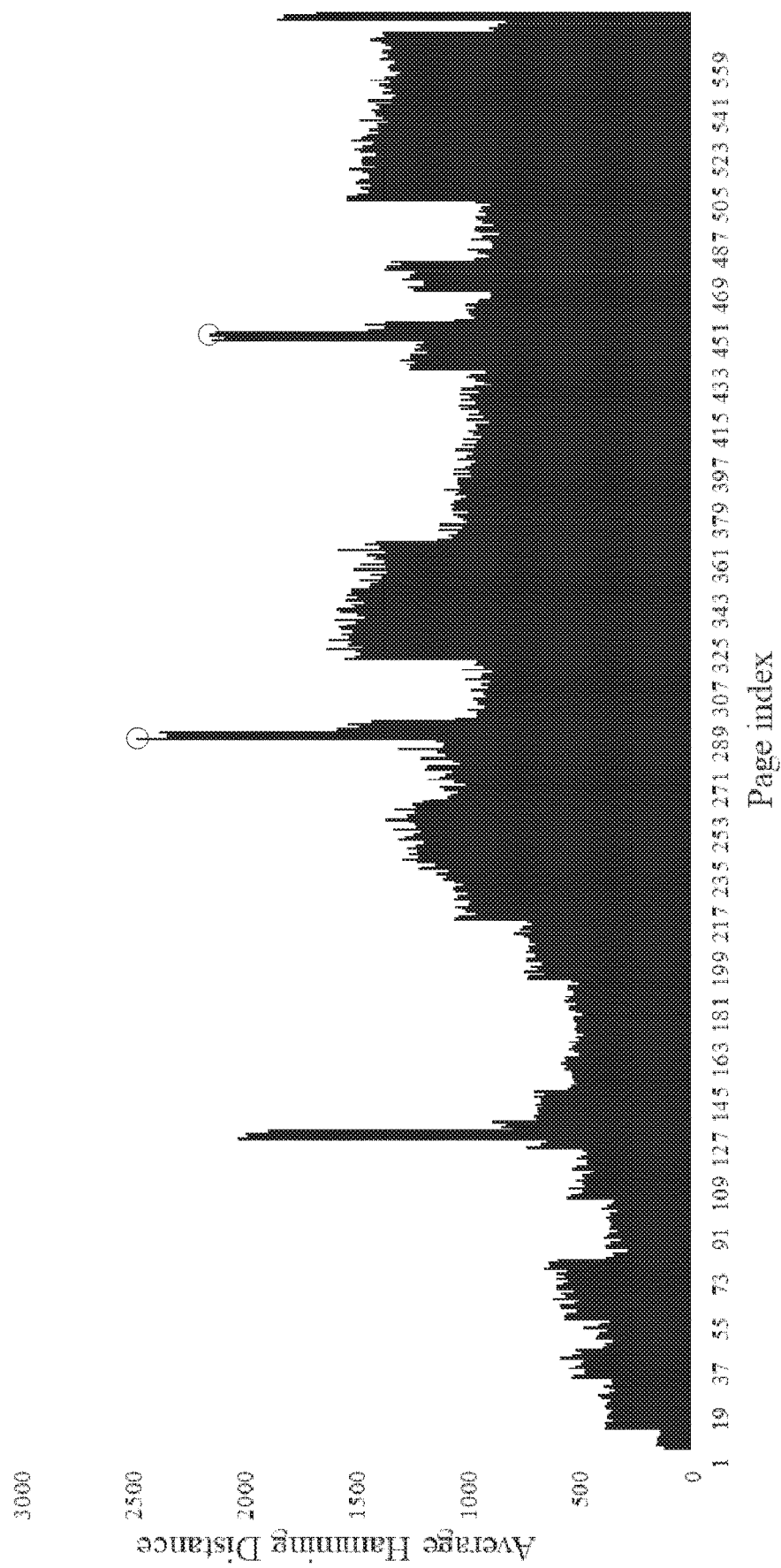
FIG. 10 is a diagram showing average Hamming distance between reads for different pages within the same memory block, in accordance with an embodiment of the present invention.
Figure 11:
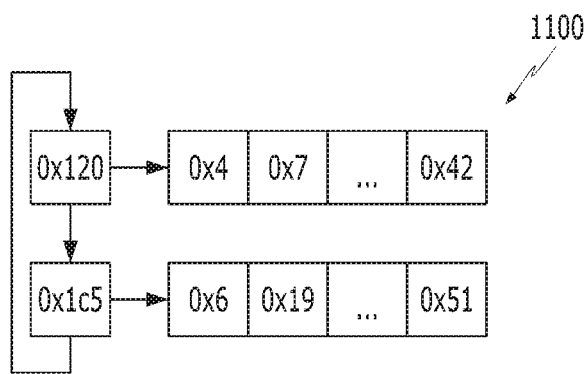
FIG. 11 is a diagram illustrating an example of a data structure for storing noisy bits from different pages within a memory block, in accordance with an embodiment of the present invention.

In step 1 of the operation stage, the size L of the register $R_{TRNG}$ is set to 32. In step 2, to estimate the number of noisy bits per page, all data was aggregated and the average Hamming distances (HDs) between reads for all pages was computed. The results for the selected memory block are graphically shown in FIG. 10, which indicates that different pages have various HDs between reads. A given HD value shows the number of noisy bits per page. Thus, page indices with a larger HD value are to be stored in a specific data structure. Here, pages 0×120 and 0×1c5 have the highest HD among all pages, as indicated in FIG. 10. A data structure 1100 in which the bits from these pages may be contained is shown in FIG. 11.

In step 3, k=0 (k=2). Steps 4-6 in the operation stage were carried out iteratively as follows.

Step 4: Read $p'_0$=0×120.
Step 5: L=32 bits are extracted from the page $p'_0$ on the positions 0×4, 0×7, . . . , 0×42, as shown in FIG. 11. $R_{TRNG}$=11 . . . 0.
Step 6: k=0.
Step 4: Read =0x1c5.
Step 5: L=32 bits are extracted from the page on the positions 0×6, 0×19, 0×51, as shown in FIG. 11. $R_{TRNG}$= 11 . . . 0.
Step 6: k=0.
Step 4: Read $p'_0$=0×120.
Step 5: L=32 bits are extracted from the page $p'_0$ on the positions 0×4, 0×7, . . . 0×42. $R_{TRNG}$=01 . . . 1.
Step 6: k=0.

Thus, a sequence of 800,000 bits was obtained from the SSD. The generated sequence contains 400,188 0's (50.02%) and 398,812 1's (49.98%). The experiment confirmed the hypothesis of uniform distribution of noisy bits in NAND memory cells.

In accordance with embodiments of the invention, the NAND structure can be successfully utilized to extract uniqueness from the memory device. Existing NAND-based storage is quite unreliable for the write and read operations conducted without scrambling and ECC. Therefore, this disadvantage can be exploited to generate a true random number sequence. The methods disclosed herein are based on PUF, which is implemented using existing firmware functions.

The true random number generator (TRNG) design in accordance with embodiments of the present invention has the following advantages. The design does not require additional circuitry (hardware overhead) for its implementation. The sequence generated cannot be reproduced in a different instance of the same device even knowing its configuration. The design can be reconfigured using parameters L and K. The noise characteristic ψ metric can be tuned for particular requirements.

Applications of the present invention include digital security. For example, the methods disclosed herein may be used to generate true random numbers required for security protocols implementation using only firmware functions. Thus, the PUF-based TRNG according to embodiments of the present invention can be utilized to enhance the security of the memory device without additional hardware cost and using only internal firmware commands.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A method for random number generation based on characteristics of a memory device that includes a plurality of memory blocks, the method comprising:
   after erasing all content in a selected memory block, writing in a raw mode with error correction disabled an all zeros pattern into the selected memory block;
   performing multiple read operations in the raw mode with the error correction disabled for each page in the selected memory block by repeatedly reading a zero value of each bit in the selected memory block having the all zeros pattern written therein;
   determining a noise characteristic value for the each bit in the selected memory block having the all zeros pattern written therein;
   identifying, from each of the repeatedly read zero values of the each bit in the selected memory block having the all zeros pattern written therein, bits having respective noise characteristic values greater than a threshold; and
   generating a random number sequence uniquely characteristic of the memory block using at least some of the identified bits.

2. The method of claim 1, further comprising:
   storing the noise characteristic values in an array.

3. The method of claim 2, further comprising:
   determining a size of a register in which the random number sequence is to be stored.

4. The method of claim 3, further comprising:
   storing information about the at least some of the identified bits in a data structure configured to store the noise characteristic value of each of the at least some of the identified bits of K chosen pages, among the plurality of pages, selected for random number sequence generation.

5. The method of claim 4, further comprising:
   initializing a page index for cyclic iteration;
   reading data from a page of the K chosen pages;
   extracting bits from the read data of the page and storing the extracted bits from the read data of the page in the register.

6. The method of claim 5, further comprising:
   incrementing the page index by modulo K;
   reading data from a next page in accordance with the incrementing the page index; and
   extracting bits from the read data of the next page and storing the extracted bits from the read data of the next page in the register.

7. The method of claim 1, wherein the determining the noise characteristic value of each bit of the plurality of bits comprises calculating a uniformity metric and a bit-flipping rate for each bit of the plurality of bits.

8. The method of claim 7, wherein the noise characteristic value of each bit of the plurality of bits is determined based on the uniformity metric and the bit-flipping rate calculated for the bit.

9. The method of claim 8, wherein, in determining the noise characteristic value of each bit of the plurality of bits, different tunable parameters are applied to the uniformity metric and the bit-flipping rate respectively.

10. The method of claim 4, further comprising:
    estimating, per page among the plurality of pages, a number of the bits having the respective noise characteristic values greater than the threshold.

11. The method of claim 10, wherein the estimating is performed by aggregating all read data and computing average Hamming distances between the multiple read operations.

12. A memory system, comprising:
    a NOT-AND (NAND)-type flash memory including memory blocks, each of the memory blocks including memory cells, each of the memory cells capable of storing multiple bits in each of the memory blocks, the memory cells in each of the memory blocks being arranged to form pages; and
    a controller configured to:
    after erasing all content in a selected memory block, write in a raw mode with error correction disabled an all zeros pattern into the selected memory block;
    perform multiple read operations in the raw mode with the error correction disabled for each page in the selected memory block by repeatedly reading a zero value of each bit in the selected memory block having the all zeros pattern written therein,
    determine a noise characteristic value for the each bit in the selected memory block having the all zeros pattern written therein,
    identify, from each of the repeatedly read zero values of the each bit in the selected memory block having the all zeros pattern written therein, bits having respective noise characteristic values greater than a threshold, and
    generate a random number sequence uniquely characteristic of the memory block using at least some of the identified bits.

13. The memory system of claim 12, wherein each of the plurality of memory cells is a memory cell capable of storing two or more bits.

14. The memory system of claim 12, wherein the controller includes a storage configured with a register in which the random number sequence is to be stored.

15. The memory system of claim 14, further comprising:
    an array in which the noise characteristic values are stored.

16. The memory system of claim 14, wherein the controller is further configured to:
    determine a size of the register.

17. The memory system of claim 16, further comprising:
    a data structure in which information about the at least some of the identified bits is stored,
    wherein the data structure is configured to store the noise characteristic value of each of the at least some of the identified bits of K pages, among the pages, selected for random number sequence generation.

18. The memory system of claim 12, wherein the controller is configured to determine the noise characteristic value by calculating a uniformity metric and a bit-flipping rate for each bit of the plurality of bits and determining the noise characteristic value of each bit of the plurality of bits based on the uniformity metric and the bit-flipping rate calculated for the bit.

19. The memory system of claim 18, wherein, in determining the noise characteristic value of each bit of the plurality of bits, different tunable parameters are applied to the uniformity metric and the bit-flipping rate respectively.

* * * * *